United States Patent
Sareen et al.

(10) Patent No.: US 10,756,996 B2
(45) Date of Patent: Aug. 25, 2020

(54) SYSTEMS AND METHODS FOR CAPTURING PACKET LOSS AND DISRUPTION DURATION INFORMATION DURING SERVICE RESTORATION

(71) Applicant: Ciena Corporation, Hanover, MD (US)

(72) Inventors: Jatin Sareen, New Delhi (IN); Atul Sharma, Gurugram (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/177,766

(22) Filed: Nov. 1, 2018

(65) Prior Publication Data

US 2020/0092186 A1    Mar. 19, 2020

(30) Foreign Application Priority Data

Sep. 19, 2018   (IN) .............................. 201811035343

(51) Int. Cl.
*H04L 12/26*    (2006.01)
*H04L 12/24*    (2006.01)

(52) U.S. Cl.
CPC ........ *H04L 43/0835* (2013.01); *H04L 41/069* (2013.01)

(58) Field of Classification Search
CPC .......................... H04L 43/0835; H04L 41/069
See application file for complete search history.

(56) References Cited

U.S. PATENT DOCUMENTS

| | | | |
|---|---|---|---|
| 9,853,722 B1 | 12/2017 | Sharma et al. | |
| 9,917,668 B2 | 3/2018 | Juneja et al. | |
| 2001/0033548 A1* | 10/2001 | Saleh | H04J 14/0295 370/218 |
| 2002/0073364 A1* | 6/2002 | Katagiri | G06F 11/327 714/48 |
| 2002/0138645 A1* | 9/2002 | Shinomiya | H04L 29/06 709/238 |
| 2004/0205236 A1* | 10/2004 | Atkinson | H04L 41/0668 709/238 |
| 2007/0097858 A1* | 5/2007 | Lesartre | G06F 11/2007 370/228 |
| 2013/0259465 A1* | 10/2013 | Blair | H04B 10/27 398/2 |
| 2014/0233456 A1* | 8/2014 | Kodama | H04L 1/188 370/328 |
| 2016/0043797 A1 | 2/2016 | Sareen et al. | |
| 2016/0173367 A1 | 6/2016 | Sareen et al. | |
| 2016/0234578 A1 | 8/2016 | Sareen et al. | |

(Continued)

*Primary Examiner* — Stephen J Clawson
(74) *Attorney, Agent, or Firm* — Clements Bernard Walker; Lawrence A. Baratta, Jr.; Christopher L. Bernard

(57) ABSTRACT

Systems and methods with a service operating in a network between an originating node and a terminating node include, responsive to detection of a fault on a service, determining a first snapshot of information at each of the originating node and the terminating node; responsive to detection of clearing of the fault, determining a second snapshot of information at each of the originating node and the terminating node; and utilizing the first snapshot of information at each of the originating node and the terminating node and the second snapshot of information at each of the originating node and the terminating node to determine packet disruption information for the service based on the fault and the clearing of the fault.

19 Claims, 7 Drawing Sheets

(56) References Cited

U.S. PATENT DOCUMENTS

2017/0288947 A1\* 10/2017 Kaniampady Sebastian ............... H04L 12/6418
2017/0317953 A1 11/2017 Sareen et al.
2018/0007147 A1 1/2018 Sareen et al.

\* cited by examiner

SYSTEMS AND METHODS FOR CAPTURING PACKET LOSS AND DISRUPTION DURATION INFORMATION DURING SERVICE RESTORATION

FIELD OF THE DISCLOSURE

The present disclosure generally relates to packet networking. More particularly, the present disclosure relates to systems and methods for capturing packet loss and disruption duration information during service restoration.

BACKGROUND OF THE DISCLOSURE

Packet services are carried over optical networks which operate a Layer 0 (photonic, such as Dense Wave Division Multiplexing (DWDM)) and Layer 1 (Time Division Multiplexing (TDM), such as Optical Transport Network (OTN)). Optical networks at L0/L1 provide service restoration due to faults such as mesh restoration through a control plane, Software Defined Networking (SDN) controller, Path Computation Element (PCE), etc. It is important for service providers to keep track of service availability for customer's Service Layer Agreements (SLAs). Conventionally, services are monitored via Performance Monitoring (PM) data which typically log 15 minute/24 hour data on a path terminating Connection Termination Point (CTP). Such PM data can be used to determine the aggregate number of seconds that are faulted in any 15 minute/24 hour duration. Further, such PM data is logged for historical monitoring. When there is a fault and subsequent restoration, the conventional PM data can provide insight into the duration of the fault. Also, higher layers (packet) can use this PM data for restoration action in such layers. Disadvantageously, the conventional PM data approach provides an approximation of the restoration time in tens of seconds accuracy. It is desired to provide such data at better accuracy than tens of seconds for SLA tracking, higher layer restoration initiation, and the like.

BRIEF SUMMARY OF THE DISCLOSURE

In an embodiment, a node in a network includes a plurality of ports; a switch configured to switch packets between the plurality of ports; and a controller communicatively coupled to the plurality of ports and the switch, wherein a service is configured in the network between a port of the plurality of ports and a terminating node in the network, wherein, responsive to detection of a fault associated with the service, the controller is configured to determine a first snapshot of information, and, responsive to detection of clearing of the fault, the controller is configured to determine a second snapshot of information, and wherein the first snapshot of information, the second snapshot of information, and corresponding snapshots at the terminating node are utilized to determine packet disruption information for the service based on the fault and the clearing of the fault. The first snapshot and the second snapshot can each include a timestamp, a count of transmitted packets, and a count of received packets. The corresponding snapshots can be exchanged via a control plane. The first snapshot of information, the second snapshot of information, and corresponding snapshots can be provided to a controller or management system, wherein the controller or management system can be configured to determine the packet disruption.

The first snapshot can include TXA_O representing transmitted packets at the originating node at the detection of the fault, TXA_T representing transmitted packets at the terminating node at the detection of the fault, RXA_O representing received packets at the originating node at the detection of the fault, and RXA_T representing received packets at the terminating node at the detection of the fault; and the second snapshot can include TXB_O representing transmitted packets at the originating node at the clearing of the fault, TXB_T representing transmitted packets at the terminating node at the clearing of the fault, RXB_O representing received packets at the originating node at the clearing of the fault, and RXB_T representing received packets at the terminating node at the clearing of the fault. The packet disruption information can include count of Packets Transmitted during disruption by the originating node=TXB_O−TXA_O; count of Packets Transmitted during disruption by the terminating node=TXB_T−TXA_T; count of Packets Received during disruption by the originating node=RXB_O−RXA_O; count of Packets Received during disruption by the terminating node=RXB_T−RXA_T. The fault can be detected via one of an Alarm Indication Signal (AIS), a Backward Defect Indicator (BDI), and a Loss of Signal (LOS).

In another embodiment, a network controller includes a processor; and memory storing instructions that, when executed, cause the processor to, for a service configured in the network between an originating node and a terminating node in the network, and responsive to detection of a fault associated with the service, obtain a first snapshot of information which is determined at each of the originating node and the terminating node, responsive to detection of clearing of the fault, obtain a second snapshot of information which is determined at each of the originating node and the terminating node, and determine packet disruption information for the service based on the fault and the clearing of the fault utilizing the first snapshot of information and the second snapshot of information.

In a further embodiment, a method includes, with a service operating in a network between an originating node and a terminating node, responsive to detection of a fault on the service, determining a first snapshot of information at each of the originating node and the terminating node; responsive to detection of clearing of the fault, determining a second snapshot of information at each of the originating node and the terminating node; and utilizing the first snapshot of information at each of the originating node and the terminating node and the second snapshot of information at each of the originating node and the terminating node to determine packet disruption information for the service based on the fault and the clearing of the fault.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a network diagram of the network in a normal traffic state of a packet service, FIG. 6 is a network diagram of the network subsequent to a fault between the nodes B, C, FIG. 7 is a network diagram of the network subsequent to the fault and restoration to a new path, and FIG. 8 is a network diagram of the network subsequent to the restoration and communication of the snapshots.

DETAILED DESCRIPTION OF THE DISCLOSURE

In various embodiments, the present disclosure relates to systems and methods for capturing packet loss and disruption duration information during service restoration. The systems and methods are implemented in an optical network with network elements/nodes operating at Layers 0 (photonic), 1 (TDM), and/or 2 (packet). The optical network can be controlled/managed by a control plane, Software Defined Networking (SDN) controller, Network Management System (NMS), or the like. The objective of the systems and methods is to obtain/provide packet loss and disruption duration information during service restoration with accuracy in the milliseconds range. The systems and methods include network elements capturing a snapshot of Transmit (Tx)/Receive (Rx) packets when a fault occurs as well as when restoration is complete (the fault clears). The Tx/Rx counters and associated timestamps are exchanged between network elements and/or provided to a higher layer management system. A receiving network element or higher layer management system can analyze and correlate this data for a packet loss computation and a hit time computation. Such computations can be displayed for a per service per disruption packet loss and/or disruption time, visualized showing the disruption time and a number of services impacted on a time scale, provided to higher layers for restoration or route planning, and the like.

Optical Network

Figure 1:
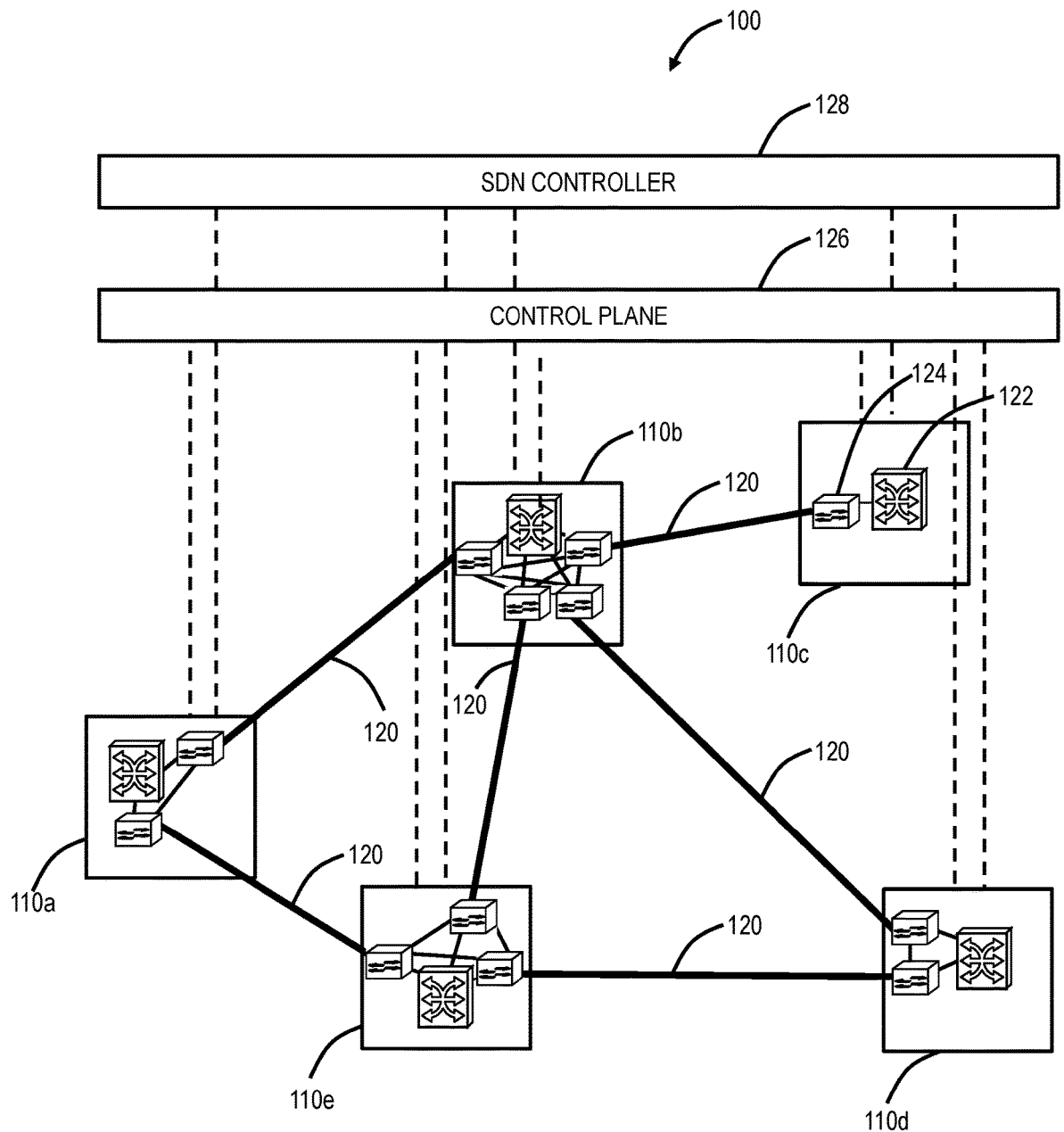
FIG. 1 is a network diagram of an example optical network with five interconnected sites.

FIG. 1 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control. Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example for implementing the path computation systems and methods.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 130 at each particular node 130. As described herein, the terms node and network element are interchangeable, each representing a device in the network 100. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

An SDN controller 128 can also be communicatively coupled to the optical network 100. SDN is a framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 128 knowing a full network topology through configuration or through the use of a controller-based discovery process in the optical network 100. The SDN controller 128 differs from a management system in that it controls the forwarding behavior of the nodes 122, 124 only, and performs control in real time or near real time, reacting to changes in services requested, network traffic analysis and network changes such as failure and degradation. Also, the SDN controller 128 provides a standard northbound interface to allow applications to access network resource information and policy-limited control over network behavior or treatment of application traffic. The SDN controller 128 sends commands to each of the nodes 122, 124 to control matching of data flows received and actions to be taken, including any manipulation of packet contents and forwarding to specified egress ports.

Example Network Element/Node

Figure 2:
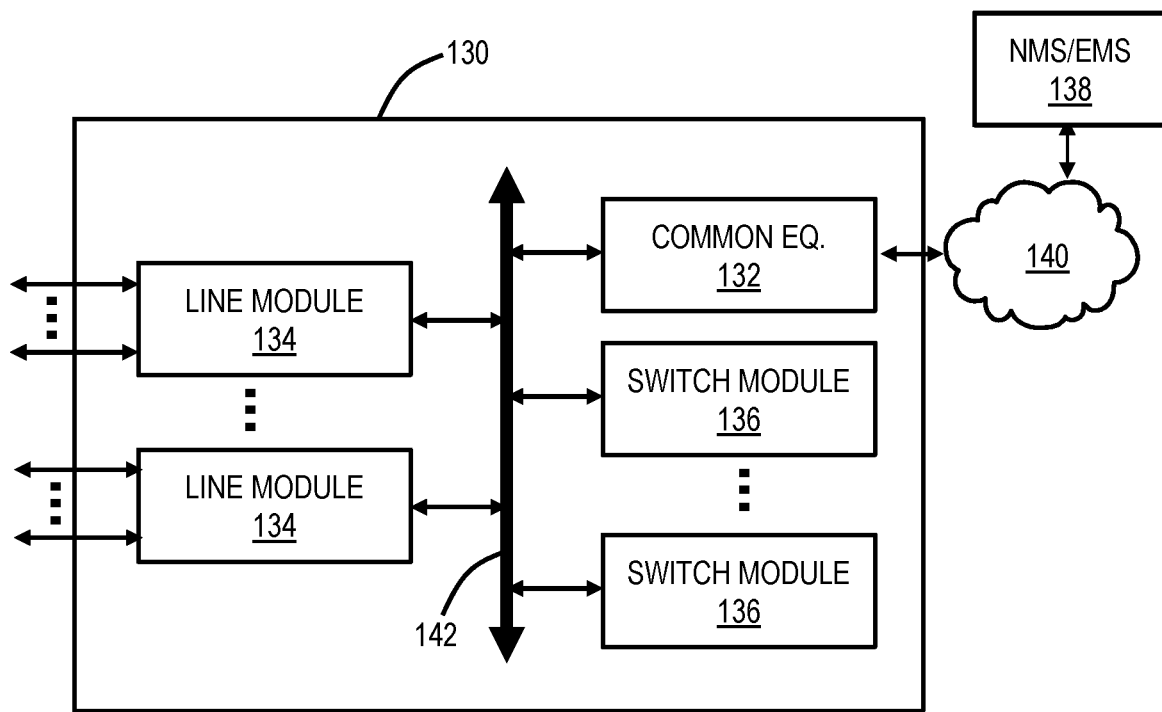
FIG. 2 is a block diagram of a node for use with the systems and methods described herein.

FIG. 2 is a block diagram of a node 130 for use with the systems and methods described herein. The node 130 can be the switch 122, the WDM network element 124, or the like. In an embodiment, the node 130 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 130 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 130 can be a system with ingress and egress digital signals and switching of channels, timeslots, tributary units, etc. Also, the node 130 can be a system with ingress and egress of optical signals and switching/routing of wavelengths. Of course, the node 130 can combine both digital signals and optical signals. While the node 130 is generally shown as an optical network element, the systems and methods contemplated for use with any switching fabric, network element, or control plane network based thereon.

The node 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), the SDN controller 128, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane 126, the SDN controller 128 as described herein. The node 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the node 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers, such as, for example, ODUn, ODUflex, OTUCn, Flexible Ethernet, etc. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the node 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching); OTN granularity; Ethernet granularity; and the like. Specifically, the switch modules 136 can include TDM and/or packet switching engines. The switch modules 136 can include redundancy as well, such as 1:1, 1:N, etc.

Those of ordinary skill in the art will recognize the node 130 can include other components which are omitted for illustration purposes, and that the systems and methods described herein are contemplated for use with a plurality of different network elements with the node 130 presented as an example of a type of network element. For example, in another embodiment, the node 130 may not include the switch modules 316, but rather have the corresponding functionality in the line modules 134 (or some equivalent) in a distributed fashion. For the node 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane 126, the SDN controller 128, etc. Furthermore, the node 130 is merely presented as one example of node 130 for the systems and methods described herein.

Controller

Figure 3:
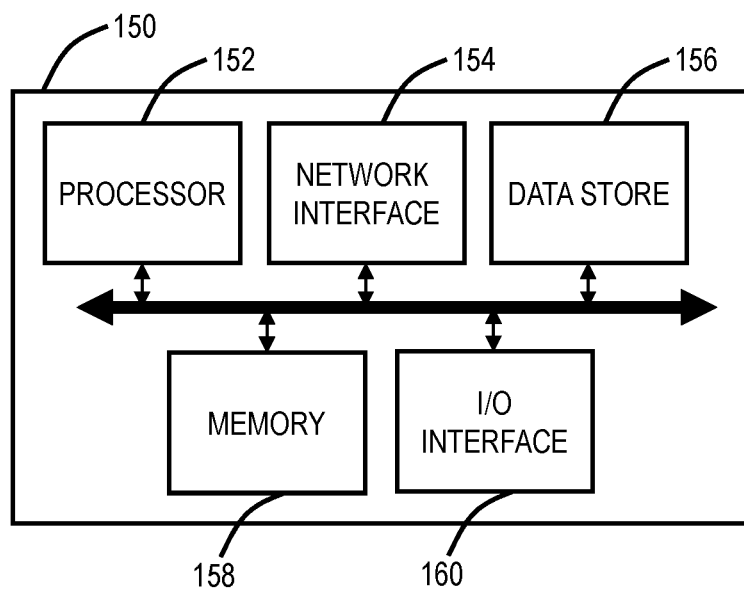
FIG. 3 is a block diagram of a controller to provide control plane processing and/or OAM&P for the node.

FIG. 3 is a block diagram of a controller 150 to provide control plane processing and/or OAM&P for the node 130. The controller 150 can be part of the common equipment, such as common equipment 132 in the node 130, or a stand-alone device communicatively coupled to the node 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include address, control, and/or data connections to enable appropriate communications on the network 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

The controller 150 can be configured to communicate with other controllers 150 in the network 100 to operate the control plane 126 and for control plane signaling. This communication may be either in-band or out-of-band. For SONET networks and similarly for SDH networks, the controllers 150 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In the WDM network elements 124, the signaling can be via an Optical Service Channel (OSC). In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements. For example, the GCC may be used for in-band signaling or routing to carry control plane traffic. Based on the intermediate equipment's termination layer, different bytes may be used to carry control plane signaling. Other mechanisms are also contemplated for control plane signaling.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. The control plane 126 can be a distributed control plane; thus, a plurality of the controllers 150 can act together to operate the control plane 126 using the control plane signaling to maintain database synchronization. In source-based routing, the controller 150 at a source node 130 for a connection is responsible for path computation and establishing by signaling other controllers 150 in the network 100, such as through a SETUP message. For example, the source node 130 and its controller 150 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e., traversing the links 120 through the nodes 130 from the originating node 130 to the destination node 130 based on a plurality of constraints such as administrative weights on the links, bandwidth availability on the links 120, etc.

Packet Disruption Information

As described herein, when there is a fault/restoration of a service in the optical network 100, there is a challenge in capturing and proving to a customer per restoration disruption counters from a network element for the service restoration. Each node 130 has real-time counters for the number of packets transmitted and received. These counters make sense only when compared between edge nodes of a domain. In isolation (i.e., viewing the counters at a single network element), these counters do not allow a determination a packet loss since the quantum of information being exchanged can be asymmetric in both directions. The snapshot of domain/path edge node counters needs to be synchronized for them to yield useful information. For example, taking a snapshot of packets at $NE_1$ at $T_0$ and $NE_2$ at $T_0+x$ seconds, this information is not useful because the number of packets sent in x seconds acts as noise yielding incorrect data. That is, unlike controlled lab scenarios, field deployed network elements have continuous running traffic where the snapshot of $T_0$ above is difficult, because the time of disruption is not pre-known (is a sporadic occurrence). The interfaces at the nodes 130 toward northbound interfaces have access to PM data which contains information which is either periodic or on demand. However, this cannot be used to gather information from different network elements in a synchronized manner.

Per disruption counts give a snapshot of the performance of a connection restoration, which gives a record of what is claimed versus what is being seen by an end customer. It could seed data for multi-layer network planning for tuning the network based on actual performance. In multi-layer, multi-level restorations, the per disruption counts can help in distinguishing which domain took how much time to restore. Typically, it is only known if a layer has exceeded upper layers soak time for action or not. Having elaborated information helps with network tuning, allowing better restoration behavior, configuration, etc.

Figure 4:
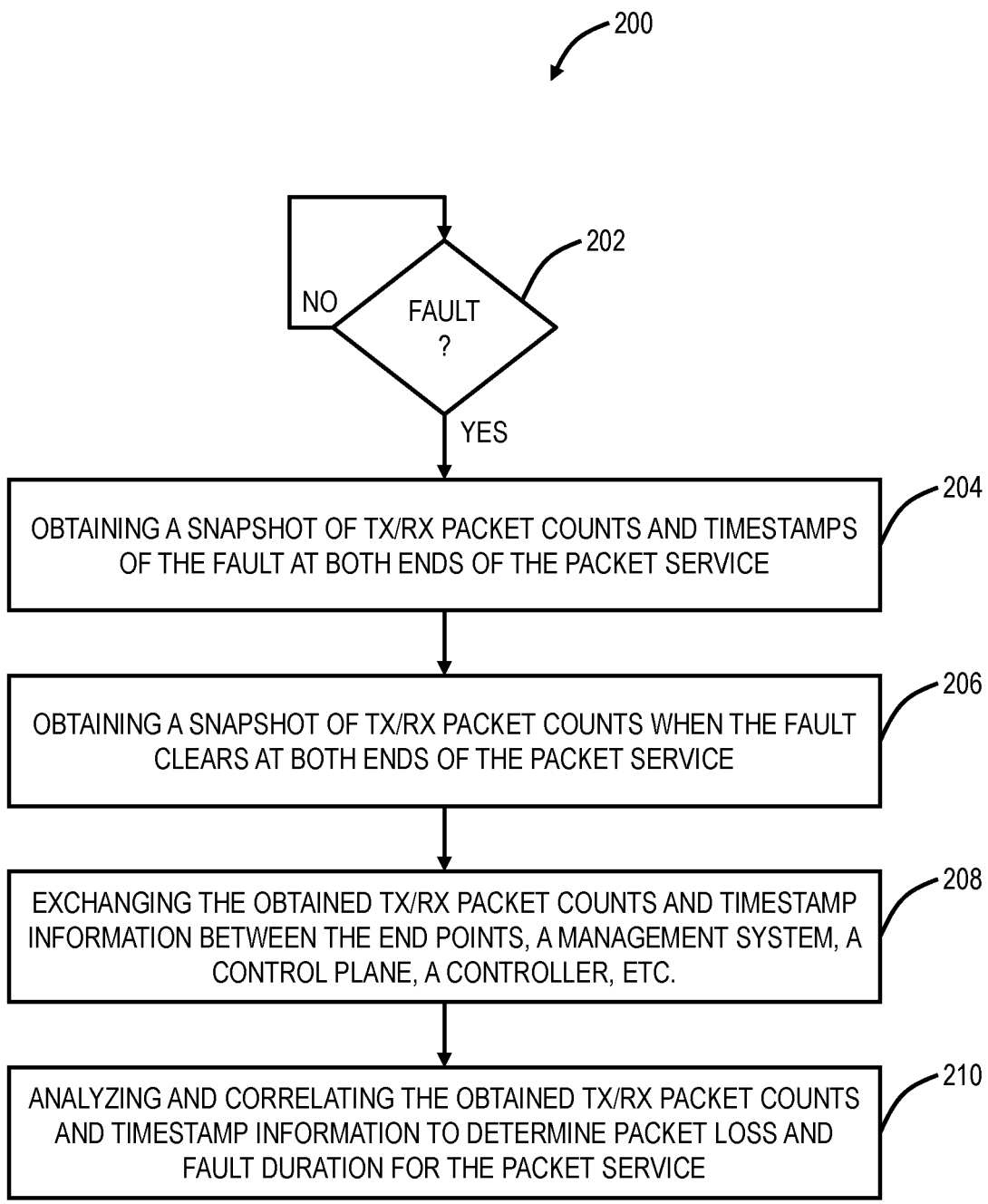
FIG. 4 is a flowchart of a packet disruption determination process, implemented in the optical network.

FIG. 4 is a flowchart of a packet disruption determination process 200, implemented in the optical network 100. Responsive to detection of a fault at two endpoints of a packet service in the optical network 100 (step 202), obtaining a snapshot of Tx/Rx packet counts and timestamps of the fault at both ends of the packet service (step 204), obtaining a snapshot of Tx/Rx packet counts when the fault clears at both ends of the packet service (step 206), exchanging the obtained Tx/Rx packet counts and timestamp information between the endpoints, a management system, a control plane, a controller, etc. (step 208), and analyzing and correlating the obtained Tx/Rx packet counts and timestamp information to determine packet loss and fault duration for the packet service (step 210).

The process 200 is implemented at two nodes 130 to capture packet Tx/Rx counts and timestamps when a fault is detected and when a fault is cleared. This information is shared via the control plane 126, the SDN controller 128, to the management system 138, between the nodes 130, via a northbound interface, etc. In a multi-layer network, there can be a pair of endpoints for each layer.

Figure 5:
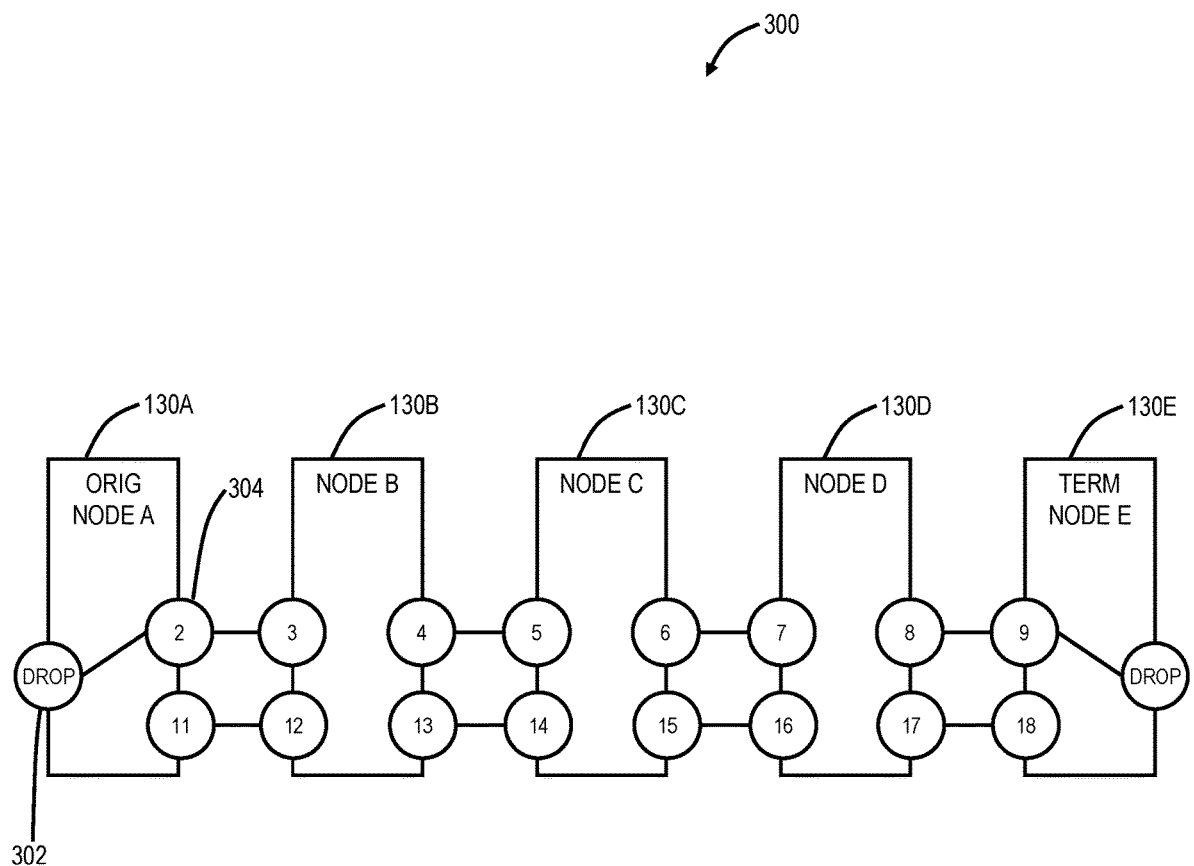
FIGS. 5-8 are network diagrams of a network illustrating an example operation of the packet disruption determination process, specifically

FIGS. 5-8 are network diagrams of a network 300 illustrating an example operation of the packet disruption determination process 200. FIG. 5 is a network diagram of the network 300 in a normal traffic state of a packet service. The network 300 can have a similar architecture as the optical network 100. For illustration purposes, the network 300 is shown in a linear topology with five nodes 130A-130E with the node 130A as an originating node and the node 130E as a terminating node of the packet service. The nodes 130A, 130E include drop ports 302. Further, the nodes 103A-130E include intermediate ports 304 (labeled as 2-9, 11-18). In this example, the packet service traverses multiple hops, namely via the intermediate ports 304 2-9. Of course, other embodiments are also contemplated including a single, point-to-point configuration, a mesh configuration, and the like. FIG. 5 is a stable state, i.e., the path and line are clear of faults in the network 300. The nodes 130A, 130D, the control plane 126, the SDN controller 128, the management system 138, etc. are configured to treat/count Tx and Rx packets at the drop ports 302 independently.

Figure 6:
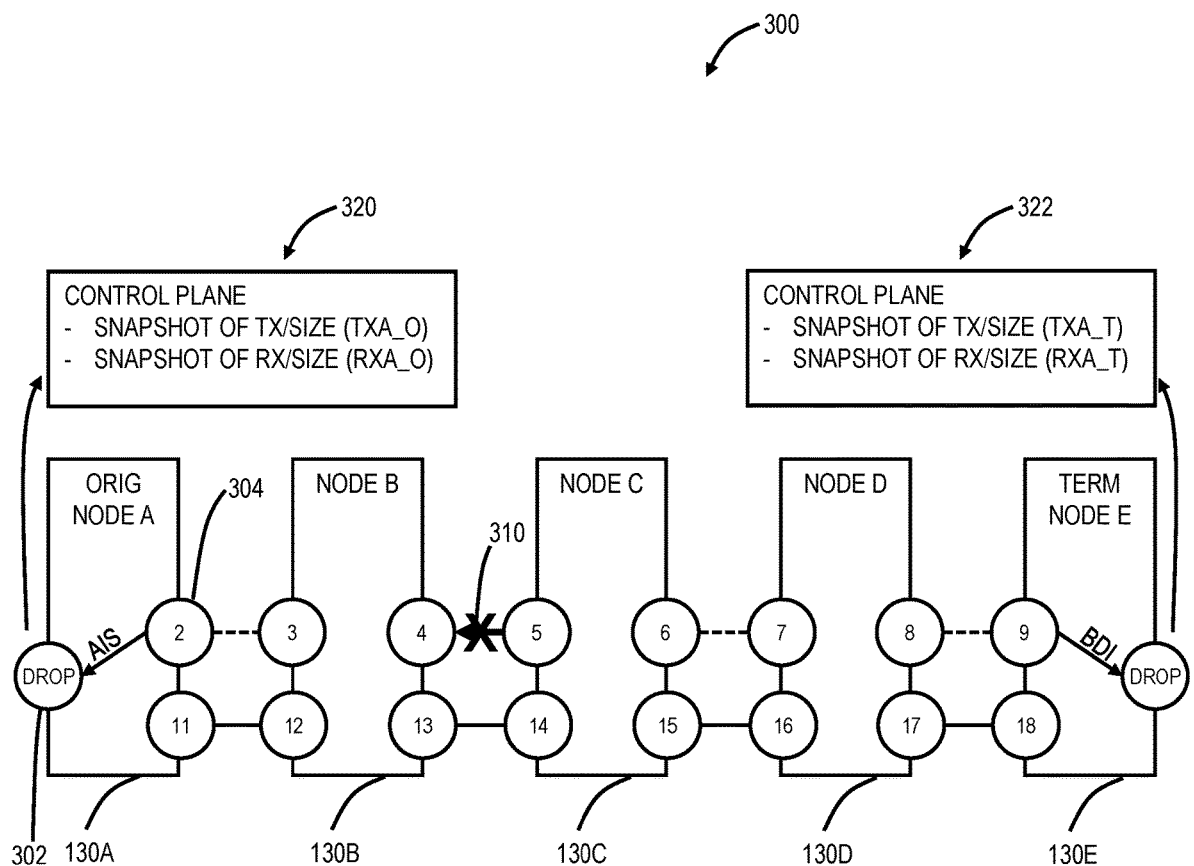

FIG. 6 is a network diagram of the network 300 subsequent to a fault 310 between the nodes 130B, 130C. For example, the fault 310 can be a fiber cut, fiber failure, port 304 failure, etc. When the fault 310 occurs on any of the spans of the packet service, the fault 310 translates to an Alarm Indication Signal (AIS) in the direction of the failure and a Backward Defect Indication (BDI) is generated in the opposite direction. Alternatively, AIS is generated in both directions in the case of a bidirectional failure. For illustration purposes, FIGS. 5-9 are shown as unidirectional and thus an AIS from the node 130B to the node 130A and a BDI is sent from the node 130C to the node 130E. In FIG. 6, the time snapshot of defect occurrence is recorded at both drop ports 302, i.e., at the time the AIS or BDI is received. In addition, the count snapshot of Transmitted and Received packets, at both endpoints is recorded. For example, the node 130A can take a snapshot 320 upon receipt of the AIS which includes a timestamp (when the AIS is received), a count of Tx packets and size (TXA_O), and a count of Rx packets and size (RXA_O). The node 130E can take a snapshot 322 upon receipt of the BDI which includes a timestamp (when the BDI is received), a count of Tx packets and size (TXA_T), and a count of Rx packets and size (RXA_T). Note, TX, RX represents transmit or receive packets, A represents a first time which is the fault detection time, and O, T representing originating or terminating node. Further, any forward path fault or backward fault path can cause restoration in the network 300, e.g., mesh restoration, protection switching, etc.

Figure 7:
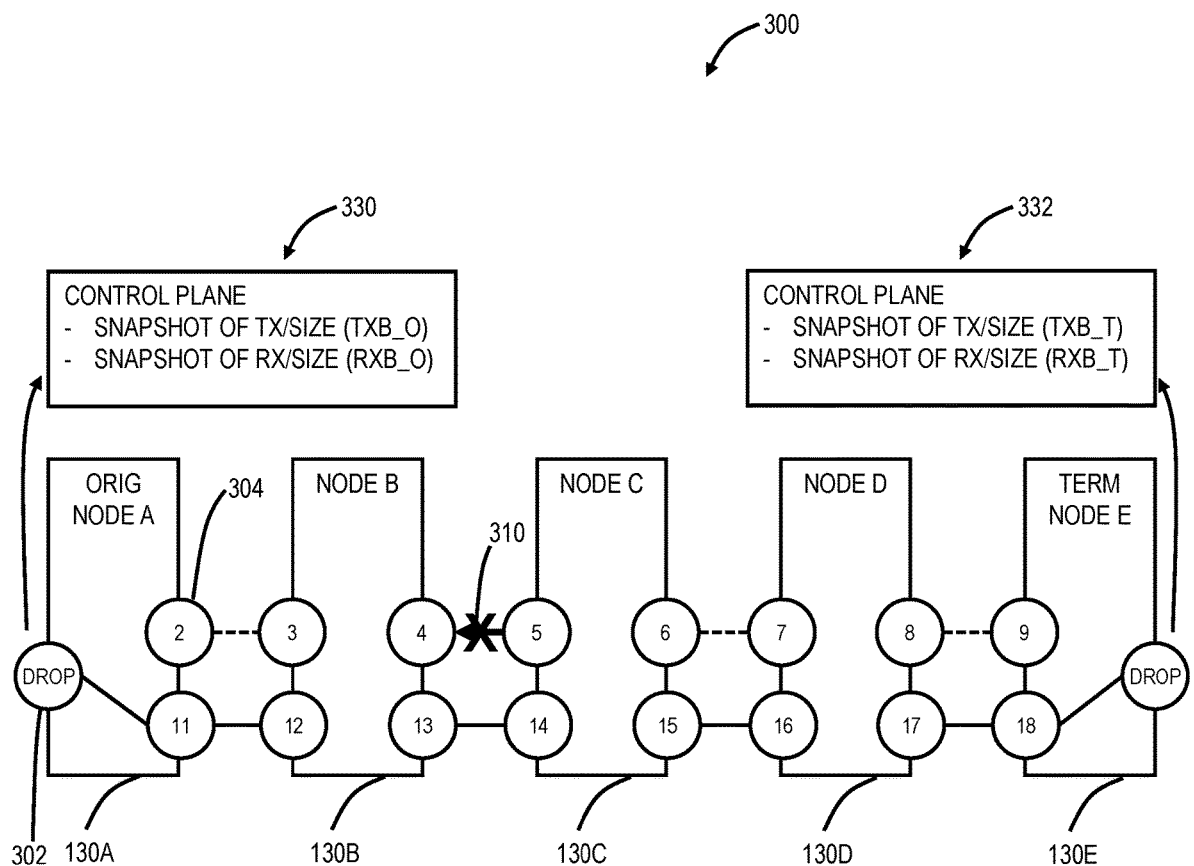

FIG. 7 is a network diagram of the network 300 subsequent to the fault 310 and restoration to a new path. Here, the packet service is restored in the network 300 on a different path, namely the intermediate ports 304 11-18. When the fault 310 is cleared and detected at the end drop ports 304, the time snapshot 330, 332 of fault clearance and the Tx, Rx packet count snapshot is taken once again. In the snapshots 330, 332, TX, RX represents transmit or receive packets, B represents a second time which is the fault clearing time, and O, T representing originating or terminating node.

Figure 8:
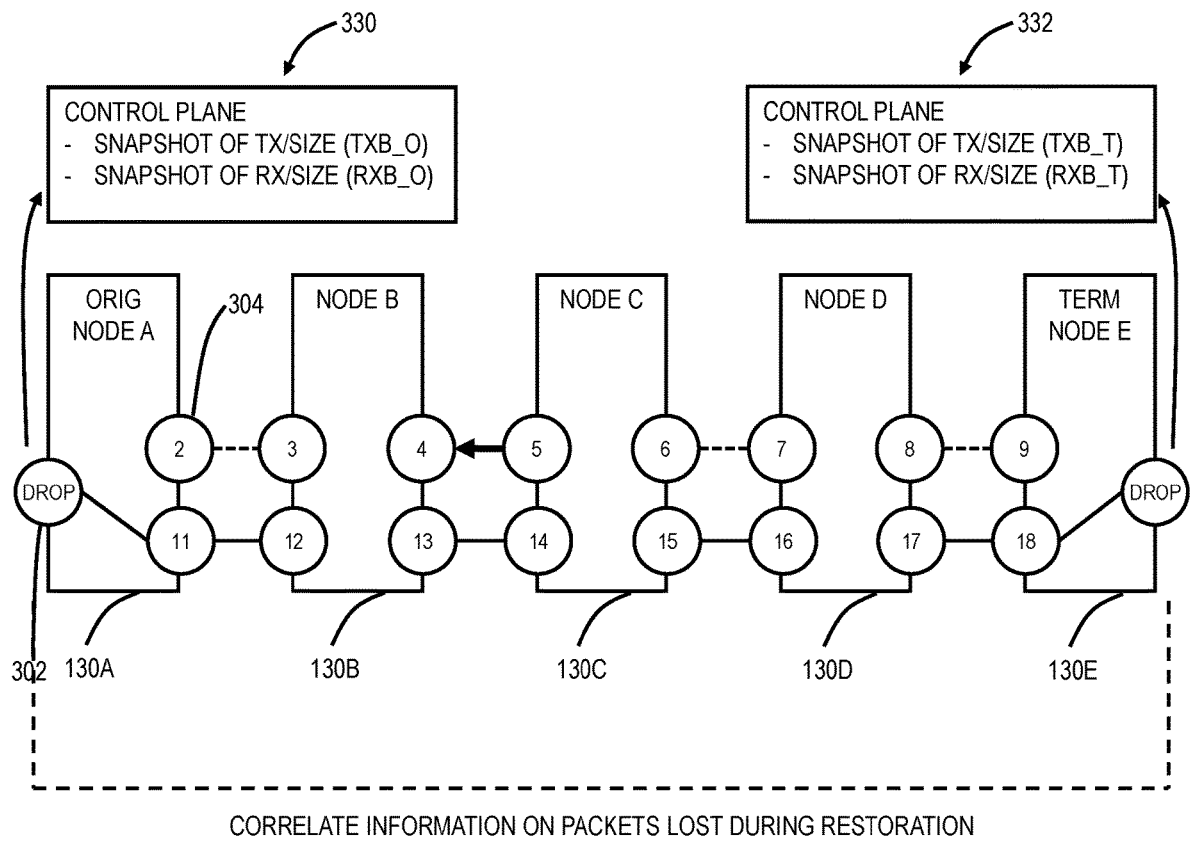

FIG. 8 is a network diagram of the network 300 subsequent to the restoration and communication of the snapshots 320, 322, 330, 332. The snapshots 320, 322, 330, 332 ("information") collected by the originating node 130A and the terminating node 130E can be exchanged with one another via the control plane 126, the SDN controller 128, the management system 138, overhead, an OSC, etc. Also, this information can be provided to a separate device (e.g., a higher layer controller, etc.)

The packet disruption information can be determined from the snapshots 320, 322, 330, 332 as follows. Count of packets dropped can be computed as below:

Count of Packets Transmitted during disruption by the originating node 130A (TX_O)=TXB_O−TXA_O.

Count of Packets Transmitted during disruption by the terminating node 130E (TX_T)=TXB_T−TXA_T.

Count of Packets Received during disruption by the originating node 130A (RX_O)=RXB_O−RXA_O.

Count of Packets Received during disruption by the terminating node 130E (RX_T)=RXB_T−RXA_T.

Packets lost in the direction of the originating node 130A to the terminating node 130E=TX_O−RX_T.

Packets lost in the direction the terminating node 130E to the originating node 130A=TX_T−RX_O This lost packet count can be computed for packets of different sizes as supported.

The data obtained above can be used to correlate the data loss/service disruption time against that reported by a third party or other client boxes that are connected to service drop ports. Comparing the above snapshots provides service restoration statistics. The interesting point is that with the involvement of the control plane 126 or the SDN controller 128, this process is automated, and the data collection is almost instantaneous.

The packet disruption determination process 200 can also cover multi-layer restorations. For example, if Layer 1 restoration does not restore the packet service in a holdoff duration, Layer 2 restoration is triggered and similar statistics can be collected at Layer 2 during the Layer 2 restoration.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node in a network comprising:
a plurality of ports;
a switch configured to switch packets between the plurality of ports; and
a controller communicatively coupled to the plurality of ports and the switch,
wherein a service is configured in the network between a port of the plurality of ports and a terminating node in the network,
wherein, responsive to detection of a fault associated with the service, the controller is configured to determine a first snapshot of information, and, responsive to detection of clearing of the fault, the controller is configured to determine a second snapshot of information, and
wherein the first snapshot of information, the second snapshot of information, and corresponding snapshots at the terminating node are provided to the controller or management system, wherein the controller or management system is configured to determine packet disruption information, and
wherein the first snapshot of information, the second snapshot of information, and corresponding snapshots at the terminating node are utilized are by the controller or the management system to determine the packet disruption information for the service based on the fault and the clearing of the fault.

2. The node of claim 1, wherein the first snapshot and the second snapshot each include a timestamp, a count of transmitted packets, and a count of received packets.

3. The node of claim 1, wherein the corresponding snapshots are provided to the controller or the management system via a control plane.

4. The node of claim 1, wherein:
the first snapshot and the corresponding snapshot at the terminating node includes
TXA_O representing transmitted packets at the originating node at the detection of the fault,
TXA_T representing transmitted packets at the terminating node at the detection of the fault,
RXA_O representing received packets at the originating node at the detection of the fault, and
RXA_T representing received packets at the terminating node at the detection of the fault; and
The second snapshot and the corresponding snapshot at the terminating node includes
TXB_O representing transmitted packets at the originating node at the clearing of the fault,
TXB_T representing transmitted packets at the terminating node at the clearing of the fault,
RXB_O representing received packets at the originating node at the clearing of the fault, and
RXB_T representing received packets at the terminating node at the clearing of the fault.

5. The node of claim 4, wherein the packet disruption information comprises Count of Packets Transmitted during disruption by the originating node=TXB_O−TXA_O;
Count of Packets Transmitted during disruption by the terminating node=TXB_T−TXA_T;
Count of Packets Received during disruption by the originating node=RXB_O−RXA_O; and
Count of Packets Received during disruption by the terminating node=RXB_T−RXA_T.

6. The node of claim 1, wherein the fault is detected via one of an Alarm Indication Signal (AIS), a Backward Defect Indicator (BDI), and a Loss of Signal (LOS).

7. A network controller comprising:
a processor; and
memory storing instructions that, when executed, cause the processor to:
for a service configured in the network between an originating node and a terminating node in the network, and responsive to detection of a fault associated with the service, obtain a first snapshot of information which is determined at each of the originating node and the terminating node,
responsive to detection of clearing of the fault, obtain a second snapshot of information which is determined at each of the originating node and the terminating node, and
determine packet disruption information for the service based on the fault and the clearing of the fault utilizing the first snapshot of information and the second snapshot of information.

8. The network controller of claim 7, wherein the first snapshot and the second snapshot each include a timestamp, a count of transmitted packets, and a count of received packets.

9. The network controller of claim 7, wherein the first snapshot of information and the second snapshot of information are obtained via a control plane.

10. The network controller of claim 7, wherein the network controller is one of a management system and a Software Defined Networking (SDN) controller.

11. The network controller of claim 7, wherein:
the first snapshot includes
TXA_O representing transmitted packets at the originating node at the detection of the fault,
TXA_T representing transmitted packets at the terminating node at the detection of the fault,
RXA_O representing received packets at the originating node at the detection of the fault, and
RXA_T representing received packets at the terminating node at the detection of the fault; and
The second snapshot includes
TXB_O representing transmitted packets at the originating node at the clearing of the fault,
TXB_T representing transmitted packets at the terminating node at the clearing of the fault,
RXB_O representing received packets at the originating node at the clearing of the fault, and
RXB_T representing received packets at the terminating node at the clearing of the fault.

12. The network controller of claim 11, wherein the packet disruption information comprises
Count of Packets Transmitted during disruption by the originating node=TXB_O−TXA_O;
Count of Packets Transmitted during disruption by the terminating node=TXB_T−TXA_T;
Count of Packets Received during disruption by the originating node=RXB_O−RXA_O; and
Count of Packets Received during disruption by the terminating node=RXB_T−RXA_T.

13. The network controller of claim 7, wherein the fault is detected via one of an Alarm Indication Signal (AIS), a Backward Defect Indicator (BDI), and a Loss of Signal (LOS).

14. A method comprising:
with a service operating in a network between an originating node and a terminating node, responsive to detection of a fault on the service, determining a first snapshot of information at each of the originating node and the terminating node;

responsive to detection of clearing of the fault, determining a second snapshot of information at each of the originating node and the terminating node; and utilizing the first snapshot of information at each of the originating node and the terminating node and the second snapshot of information at each of the originating node and the terminating node to determine packet disruption information for the service based on the fault and the clearing of the fault.

15. The method of claim 14, wherein the first snapshot and the second snapshot each include a timestamp, a count of transmitted packets, and a count of received packets.

16. The method of claim 14, further comprising:
exchanging the first snapshot and the second snapshot via a control plane.

17. The method of claim 15, further comprising:
exchanging the first snapshot and the second snapshot to a controller or management system, wherein the controller or management system is configured to perform the utilizing.

18. The method of claim 14, wherein:
the first snapshot includes
$TXA\_O$ representing transmitted packets at the originating node at the detection of the fault,
$TXA\_T$ representing transmitted packets at the terminating node at the detection of the fault,
$RXA\_O$ representing received packets at the originating node at the detection of the fault, and
$RXA\_T$ representing received packets at the terminating node at the detection of the fault; and
The second snapshot includes
$TXB\_O$ representing transmitted packets at the originating node at the clearing of the fault,
$TXB\_T$ representing transmitted packets at the terminating node at the clearing of the fault,
$RXB\_O$ representing received packets at the originating node at the clearing of the fault, and
$RXB\_T$ representing received packets at the terminating node at the clearing of the fault.

19. The method of claim 18, wherein the packet disruption information comprises
Count of Packets Transmitted during disruption by the originating node=$TXB\_O-TXA\_O$;
Count of Packets Transmitted during disruption by the terminating node=$TXB\_T-TXA\_T$;
Count of Packets Received during disruption by the originating node=$RXB\_O-RXA\_O$; and
Count of Packets Received during disruption by the terminating node=$RXB\_T-RXA\_T$.

* * * * *